United States Patent [19]
Whittington

[11] Patent Number: 5,509,690
[45] Date of Patent: Apr. 23, 1996

[54] SIDE SPRAY SAFETY APPARATUS

[75] Inventor: Flavious L. Whittington, Hamer, S.C.

[73] Assignee: Truck Safety of America, Inc., Rock Hill, S.C.

[21] Appl. No.: 100,627

[22] Filed: Jul. 30, 1993

[51] Int. Cl.⁶ .................................................. B62D 25/18
[52] U.S. Cl. ................................. 280/851; 280/847
[58] Field of Search ....................... 280/851, 852, 280/848, 847, 854, 853, 152.3, 154; 293/112; D12/184, 185

[56] References Cited

U.S. PATENT DOCUMENTS

| | | | |
|---|---|---|---|
| D. 282,458 | 2/1986 | Whittington | D12/181 |
| D. 282,535 | 2/1986 | Whittington | D12/181 |
| 3,006,658 | 10/1961 | Wenham | 280/857 |
| 3,027,178 | 3/1962 | Eaves | 280/851 |
| 3,721,459 | 3/1973 | Lea | 280/851 |
| 3,830,520 | 8/1974 | Kelly | 280/154 |
| 3,877,722 | 4/1975 | Conner | 280/154 |
| 4,089,537 | 5/1978 | Pralutsky | 280/851 |
| 4,192,522 | 3/1980 | Morgan | 280/851 |
| 4,258,929 | 3/1981 | Brandon et al. | 280/851 |
| 4,832,356 | 5/1989 | Liberto et al. | 280/851 |
| 5,199,742 | 4/1993 | Gotz et al. | 280/851 |

FOREIGN PATENT DOCUMENTS

| | | | |
|---|---|---|---|
| 0120760 | 10/1984 | European Pat. Off. | 280/851 |
| 0204681 | 12/1986 | European Pat. Off. | 280/851 |

OTHER PUBLICATIONS

Davis S. Whiteman, *The Herald*, "Tragedy, Danger Spark Invention" Oct. 18, 1988, p. 3B.

Primary Examiner—Anne Marie Boehler
Attorney, Agent, or Firm—W. Thad Adams, III

[57] ABSTRACT

This invention is related to a safety apparatus for reducing side spray for trucks and other vehicles. The apparatus includes a flexible flap suspended behind the tires of the vehicle with a stiffening device of relatively elongate construction arranged at the outer edge thereof and extending forwardly therefrom. The flap further lacks any substantial stiffening element at the inner edge thereby effecting the flap so that the flap deflects inwardly along the inner edge of the flap and thereby directs air currents and roadway fluids to the inside of the truck. The stiffening device also obstructs fluids from passing around the outer edge of the flap with a forwardly extending main wall portion and an inwardly directed leading wall portion.

11 Claims, 5 Drawing Sheets

SIDE SPRAY SAFETY APPARATUS

FIELD OF THE INVENTION

This invention relates to safety devices for reducing or redirecting rain, snow, sleet, ice, debris and other roadway materials that are lifted and sprayed outwardly into the vision path of other vehicles by the tires of motorized vehicles, particularly large wheeled trucks travelling on paved highways.

BACKGROUND OF THE INVENTION

It is conventional practice to provide mud or rain flaps behind the wheels of motorized vehicles and in particular behind those of large trucks and associated trailers. These flaps are generally intended to reduce the volume of debris and rainwater that is thrown from the rotating tires of a truck while the truck moves along a roadway in inclement weather. Rain flaps have to some extent reduced the hazards posed by flying debris and rainwater directly behind such a vehicle, however, the flaps in turn have a disadvantageous tendency to deflect substantial amounts of rainwater, snow, sleet, ice and other debris outwardly from the sides of the truck. Such side sprays pose a significant hazard to other motorists by obstructing the vision path of other motorists in the vicinity of the truck, including those following the truck or those passing the truck in either direction. Driving in the vicinity of a truck during inclement weather therefore, often means that the drivers of such other vehicles will be temporarily blinded. The spray in some circumstances may extend fifteen to twenty feet out to each side, making the truck a continuously moving barrier to safe vision.

Several arrangements have been proposed to reduce the spray caused by such vehicles, such as that described in U.S. Pat. No. 3,006,658 to Wenham et al. Wenham discloses a bracket that follows the contour of the tires of the truck and guards against throwing material out to the side. However, the configuration of Wenham et al. causes substantial air turbulence around the leading edge of the bracket. Accordingly, this has not proven to be fully satisfactory since the air currents around the outside edges of the flaps still tend to throw materials and debris out to the side.

U.S. Pat. No. 3,721,459 to Lea discloses a shield extending around the upper portion of the tire to reduce side spray. However, there is no provision to reduce air flow across the forward surface of the flap or reduce the turbulence at the edges thereof which tend to cause side spray. Accordingly, Lea has not proven satisfactory.

U.S. Pat. No. 3,830,520 to Kelly and U.S. Pat. No. 3,877,722 to Conner propose mud flap stiffeners to prevent the flap from sailing or flying away from the wheel and enhancing the performance of the flap. However, there is no provision in these arrangements for controlling or directing the air flow across the forward side of the flaps. Further, the flaps in each of these arrangements create vortices which in conjunction with the lateral air currents across the surface of the flaps produce side spray.

U.S. Pat. No. 3,027,178 to Eaves and U.S. Pat. No. 4,382,606 to Lightle, et al. have proposed improved designs for the flaps. Eaves discloses a molded plastic flap with flanges and ribs to make the flap more rigid to avoid sailing. Lightle et al. discloses a mud flap with flow-directing ribs on the surface to catch the water and direct it down the surface of the flap. The flap also includes vertically extending side flanges to confine the water on the surface and prevent it from escaping around the side edges of the flap. These flaps, however, tend to allow some water to escape around the sides of the flap.

Accordingly, it is an object of the present invention to provide an apparatus which substantially reduces the side spray from flaps and avoids the disadvantages of the prior art as discussed above.

SUMMARY OF THE INVENTION

The above and other objects have been achieved by the provision of a safety apparatus comprising a generally rectangular flexible mud flap adapted to be suspended substantially vertically from a portion of a vehicle immediately rearward of the tires of the vehicle. An elongate relatively rigid stiffening device is mounted along the outer vertical edge to extend vertically along a substantial extent of the flap. The stiffening device substantially prevents materials adjacent the forward side of the flap from passing outwardly from the outer vertical edge of the flap. The stiffening device further serves to impart stiffness to the outer edge of the flap so that the portion of the flap adjacent the stiffening device is not deflected to any substantial degree. The inner vertical edge of the flap is free of any substantial stiffening means so as to be readily deflectable by the air currents from the movement of the vehicle such that the flap is deflected at an inward angle to direct a substantial portion of the air currents and rainwater inwardly to the vehicle. The stiffening device is more particularly comprised of a generally vertical elongate main wall portion extending rearwardly from the flap and having an overall width being only a fraction of its length. The main wall portion further has an inwardly directed forwardmost wall portion defining a leading edge thereof which also serves as the leading edge of the device.

The device preferably includes a rear wall portion adjoining the main wall portion at a generally perpendicular angle therewith for aligning flush with the rearward side of the flap. Therefore, the device serves to cause air currents around the outer edge of the flap to be directed inwardly to the vehicle with a reduction of vortices.

BRIEF DESCRIPTION OF THE DRAWINGS

Some of the features of the present invention have been stated and others will appear as the description proceeds when taken in conjunction with the accompanying drawings in which.

DETAILED DESCRIPTION OF THE DRAWINGS

Figure 1:
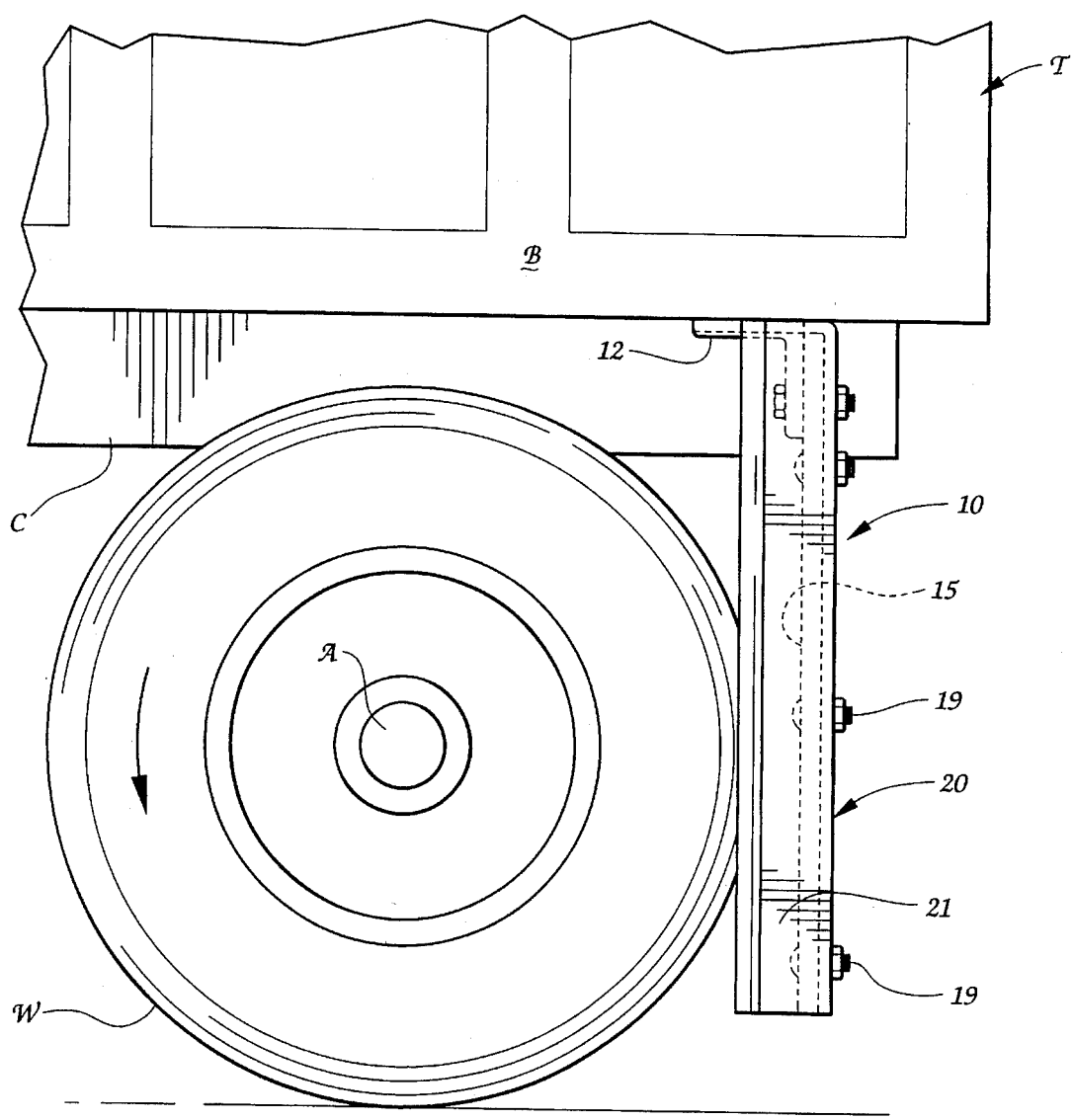
FIG. 1 is a fragmentary side elevation view of a truck with a safety apparatus embodying the features of the present invention suspended behind the wheel of the truck.
Figure 2:
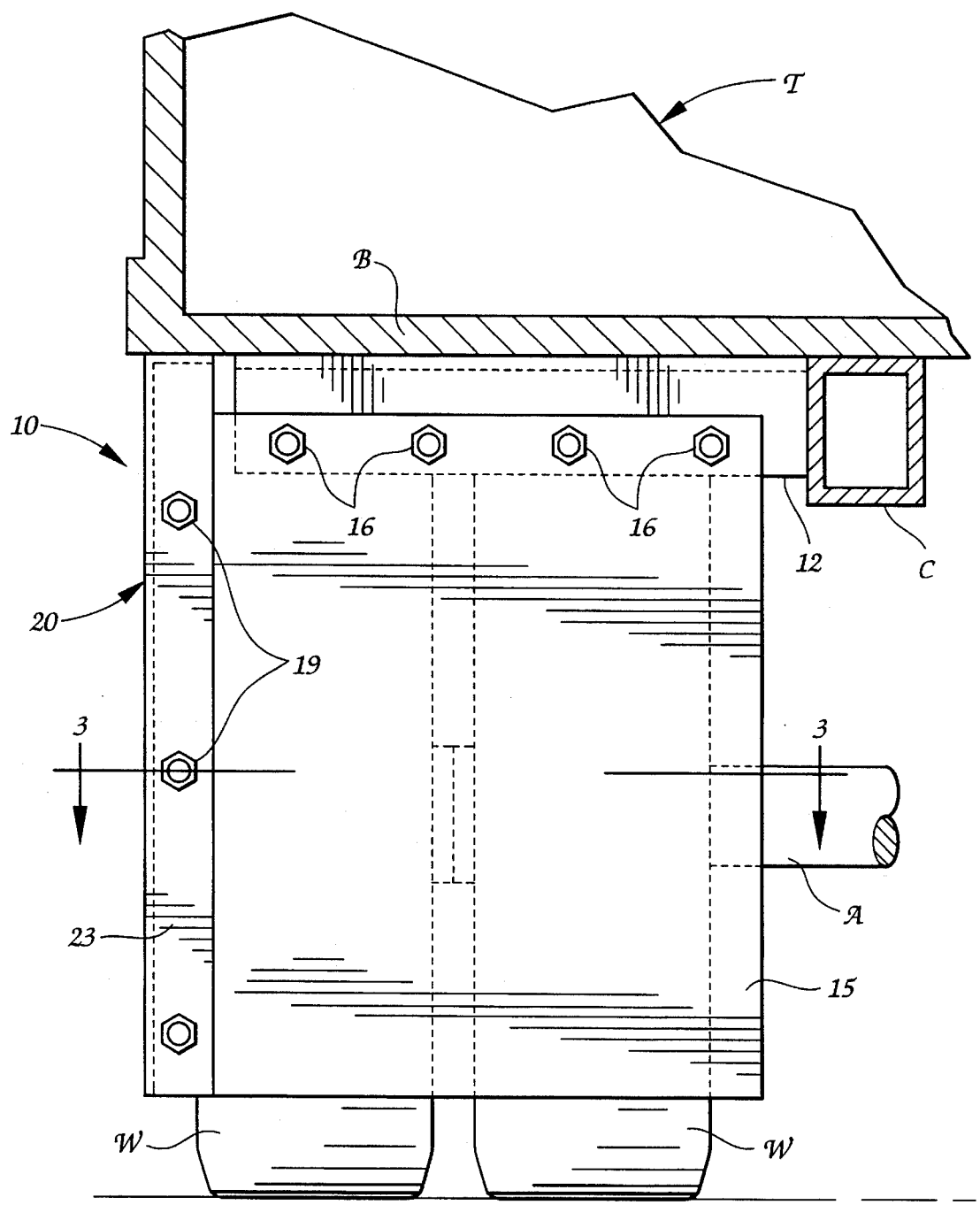
FIG. 2 is a fragmentary rear elevation view of the truck and safety apparatus.

Referring now more particularly to the drawings, FIGS. 1 and 2 illustrate portions of the rear of a truck T. The truck T is a representative of many vehicles that would benefit from the safety apparatus of the present invention. The truck T is of generally conventional design which includes a chassis frame C carrying a vehicle body B. The chassis frame is supported by at least two axles A (only one shown) and a plurality of wheel and tire combinations W connected to the ends of the axles for moving along a roadway. The safety apparatus of the present invention is generally indicated by the numeral 10 and is positioned generally behind the wheels W so as to receive rainwater and other roadway debris lifted by the wheels. It should be noted that the illustrated embodiment is a left side safety apparatus and that a complementary right side safety apparatus is constructed in a similar manner suitable for use on the right side.

The safety apparatus 10 comprises an elongate flexible generally rectangular flap 15 supported by a bracket 12. The bracket 12 generally comprises an angle bar with one flange secured to the vehicle body B and the other depending downwardly therefrom. An upper portion of the flap 15 is attached to the downwardly depending flange of the bracket so that the flap is suspended in a generally vertical orientation by suitable means such as bolts 16. The flap 15 has a forward side disposed toward the wheels W and a rearward side disposed toward the rear of the truck T. The flap 15 further has inner and outer vertical edges designated as 15*a* and 15*b* (FIG. 3), respectively. The outer edge 15*b* is disposed toward the side of the truck T and the inner edge 15*a* is disposed inwardly to the truck.

An elongate relatively rigid stiffening device 20 is attached along the outer vertical edge 15*b* of the mud flap 15 by conventional means such as bolts 19, and is mounted to extend vertically alongside a substantial extent of the flap. The stiffening device 20 is arranged to impart stiffness to the outer edge 15*b* of the flap to minimize deflection of the flap along the outer edge 15*b* as a result of a rearward flow of air from the vehicle moving along a roadway.

Figure 4:
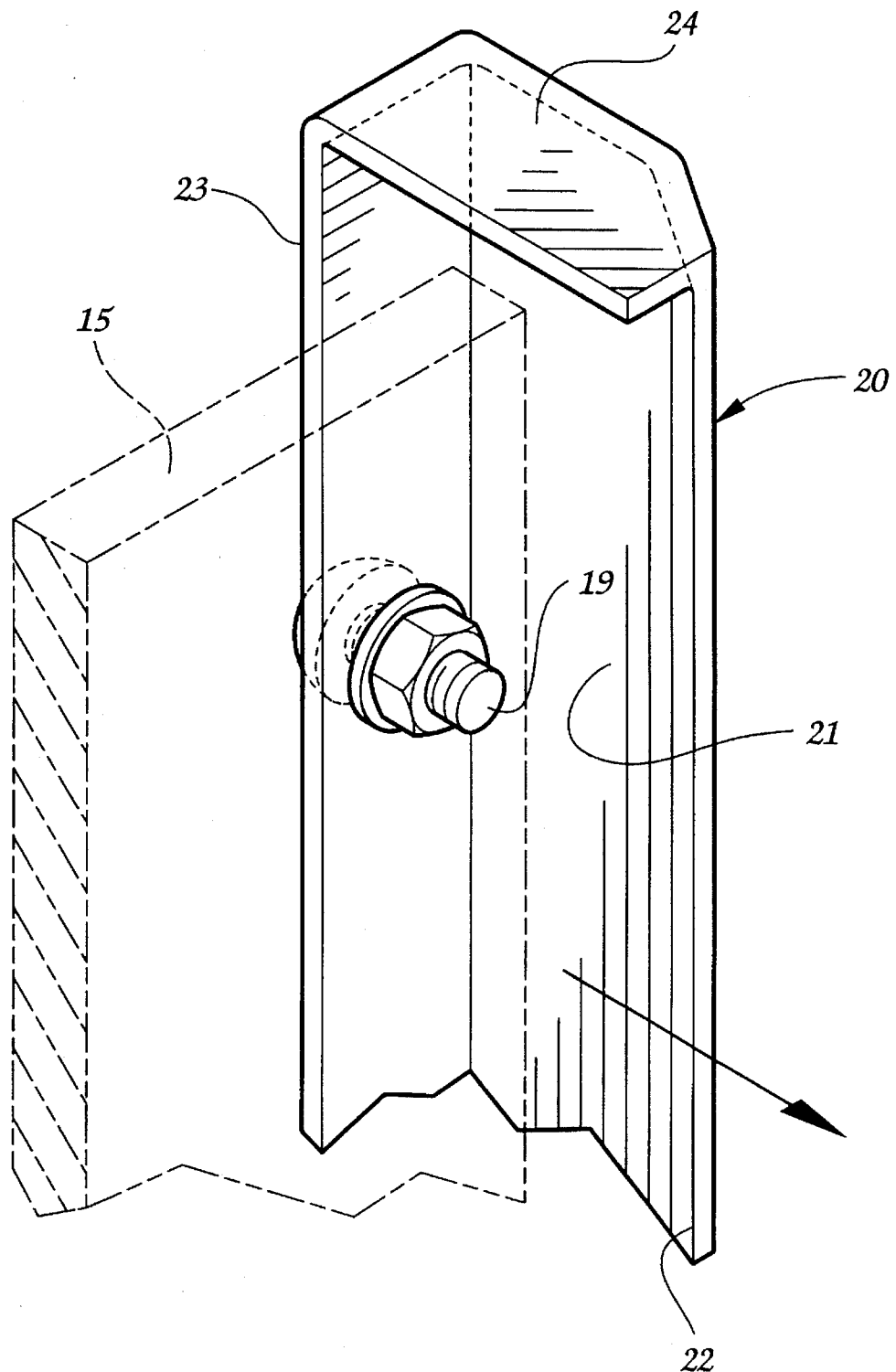
FIG. 4 is a fragmentary top perspective view of the safety apparatus particularly illustrating the stiffening device as it is attached to the mud flap.

The stiffening device 20 comprises an elongate main wall portion 21 which is arranged at a generally right angle with the mud flap and to extend forwardly therefrom. The elongate main wall portion 21, has an overall width which is only a fraction of its length, and includes an inwardly directed forwardmost wall portion 22 that defines a leading edge of the main wall portion 21 and also serves as the leading edge of the stiffening device 20. In the preferred embodiment, the leading wall portion 22 forms an inward angle of between about 30° and 60° with respect to the main wall portion 21. The stiffening device 20 further comprises a rear wall portion 23 (FIG. 4) which is joined to the main wall portion 21 at the rear edge of the main wall portion 21 at a generally perpendicular angle therewith for lying flush with one of the sides of the mud flap 15. Preferably the rear wall portion 23 lies on the rearward side of the mud flap 15 so as to provide a smooth outer edge of the safety apparatus 10 device. A top wall portion 24 of the stiffening device 20 is positioned adjoining the upper edges of each of the main wall and rear wall portions 21 and 23 to provide a smooth upper surface for the stiffening device 20.

Figure 3:
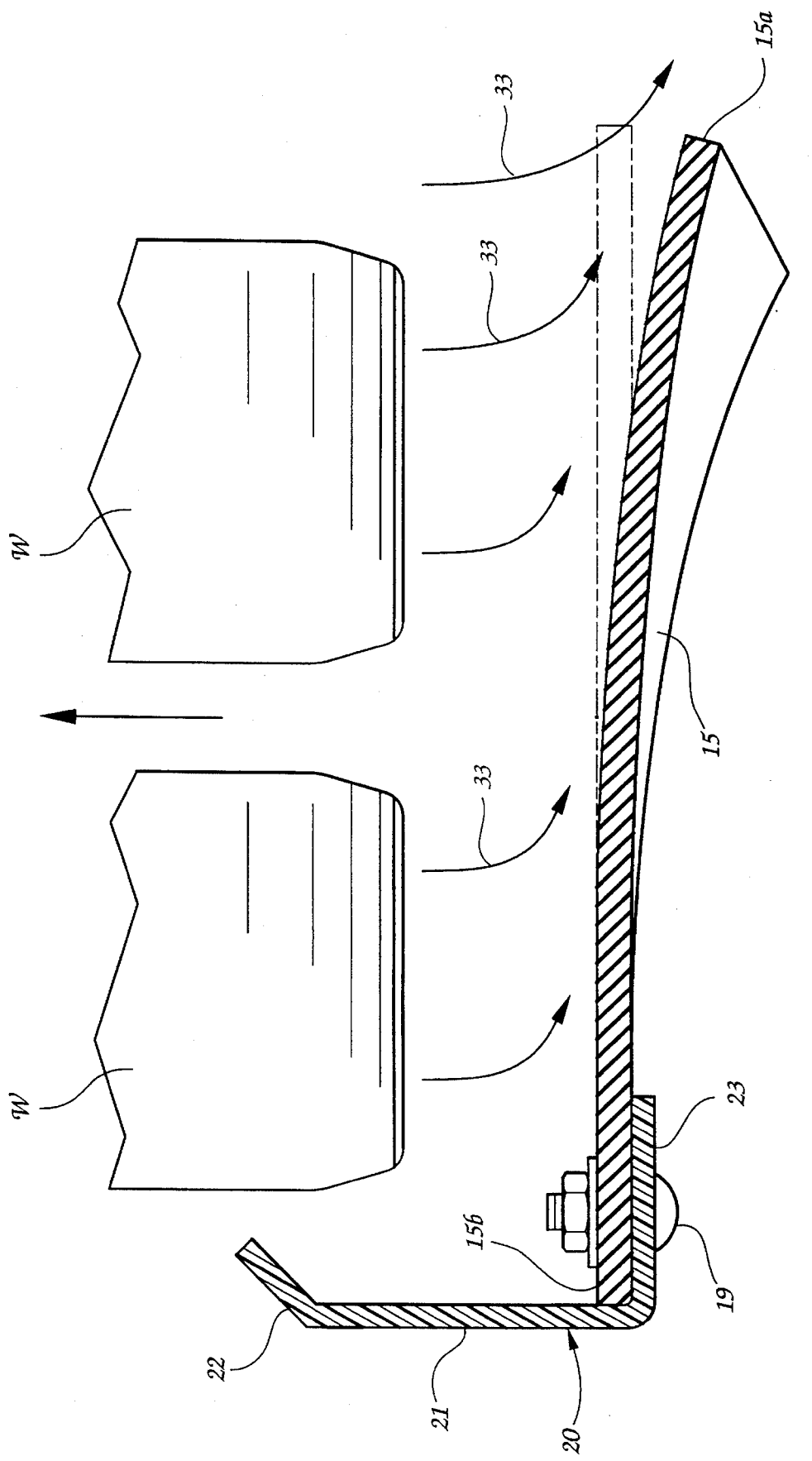
FIG. 3 is a fragmentary top section view taken along the line 3—3 in FIG. 2, however, illustrating the flexing of the flap during movement of the vehicle.

In use, the flap 15 is spaced behind the wheels to catch and deflect a portion of roadway fluids such as rain, ice, snow, slush, sleet, debris and other roadway materials being lifted by the wheels. The flap 15 receives the roadway fluids and debris on the forward side thereof which preferably catches the fluids and permits them to run off the bottom edge thereof. The stiffening device 20 stiffens the outer edge 15*b* of the flap 15 while the inner edge 15*a* of the flap 15 is maintained relatively free of any stiffening means. Accordingly, the flap deflects inwardly at an angle as illustrated in FIG. 3 under the force of air currents from the vehicle. As a result of the angular deflection, the air currents moving across the forward side of the flap are directed inwardly to the truck in the direction of the deflection as indicated in FIG. 3 by the arrows 33. With the air currents moving inwardly relative the truck T, the fluid on the forward side tends to be carried by the air currents moving toward the inside of the truck. Therefore, the hazard posed to motorists in lanes adjacent lanes of the truck is minimized.

The stiffening device 20 also prevents roadway materials from passing around the outer edge 15*b* by essentially catching and obstructing the outward movement of the materials along the forward side of the flap 15. As is most clearly shown in FIG. 3 the main wall portion 21 extends forwardly from the outside edge 15*b* of the flap 15 to close the path around the edge 15*b* of the flap 15. In some instances, the materials being thrown by the tires may bounce off of the flap 15. To prevent the materials from bouncing off the flap and around the leading edge of the main wall portion 21, the leading wall portion 22 is beveled inwardly to prevent materials from easily bouncing the forward leading edge of the stiffening device 20.

The stiffening device 20 further prevents roadway materials from passing over upper portions thereof with the top wall portion 24. In the preferred arrangement, the top wall portion 24 is flush with the under side of the body portion eliminating any gap between the body B and the stiffening device 20.

The stiffening device 20 further has a smooth outer contour which provides a smooth air flow around the stiffening device and minimizes turbulence and vortices which may otherwise compound the outward spray. It would be virtually impossible to totally eliminate the spray of materials such as rainwater from the sides of a vehicle. However, by minimizing turbulence at the outer edge of the flap 15, the spray that escapes the stiffening device 20 is not pushed further away from the sides of the vehicle by turbulence, etc. Accordingly, the preferred direction for the roadway fluids to be directed is inside to the truck, downwardly to the roadway from the bottom surface of the flap, and to a minimum extent, closely around to the outer edge 15*b*.

It has been determined that the safety apparatus 10 operates most effectively when it is spaced between 10 and 18 inches behind the wheel. The most optimal results have been achieved at about 14 inches.

The stiffening device 20 is preferably formed as an integral unit and made of lightweight plastic material with a nonstick coating so that mud and debris will not adhere and thereby change its effective configuration. The preferred material is talc-filled polypropylene although there may be other useful materials.

Figure 5:
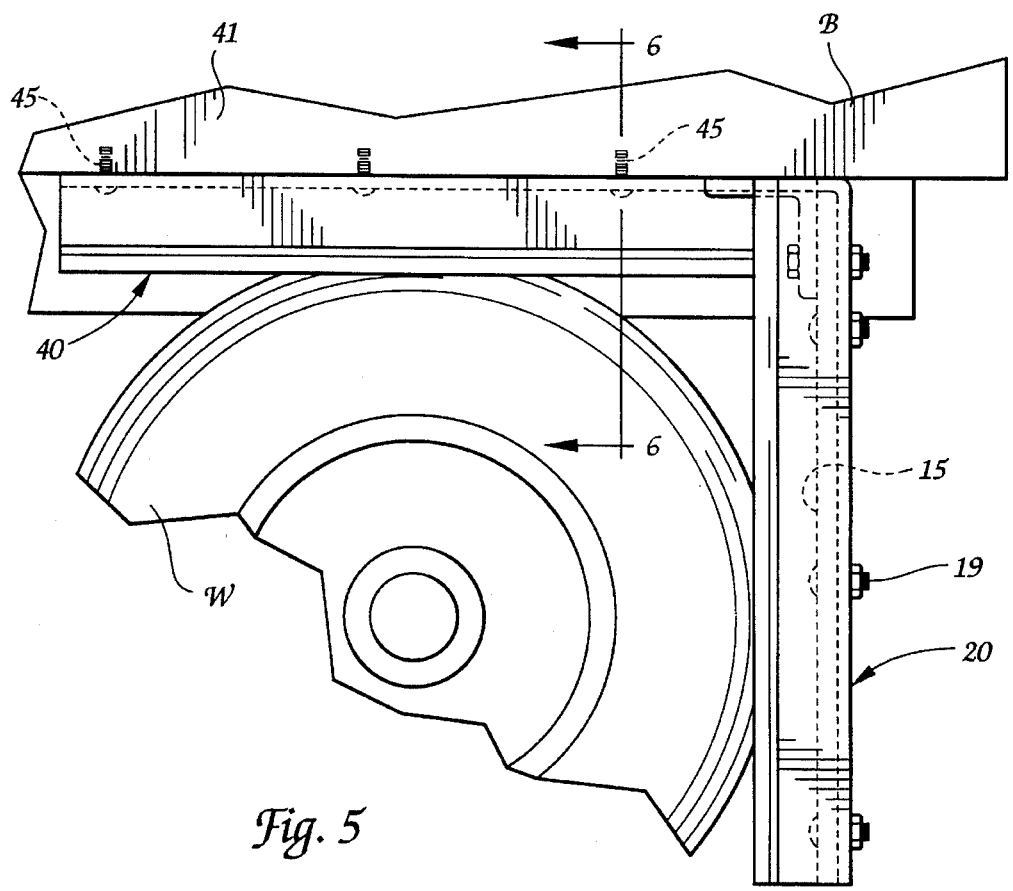
FIG. 5 is a fragmentary side elevation view similar to FIG. 1 illustrating an alternative arrangement of the safety apparatus.
Figure 6:
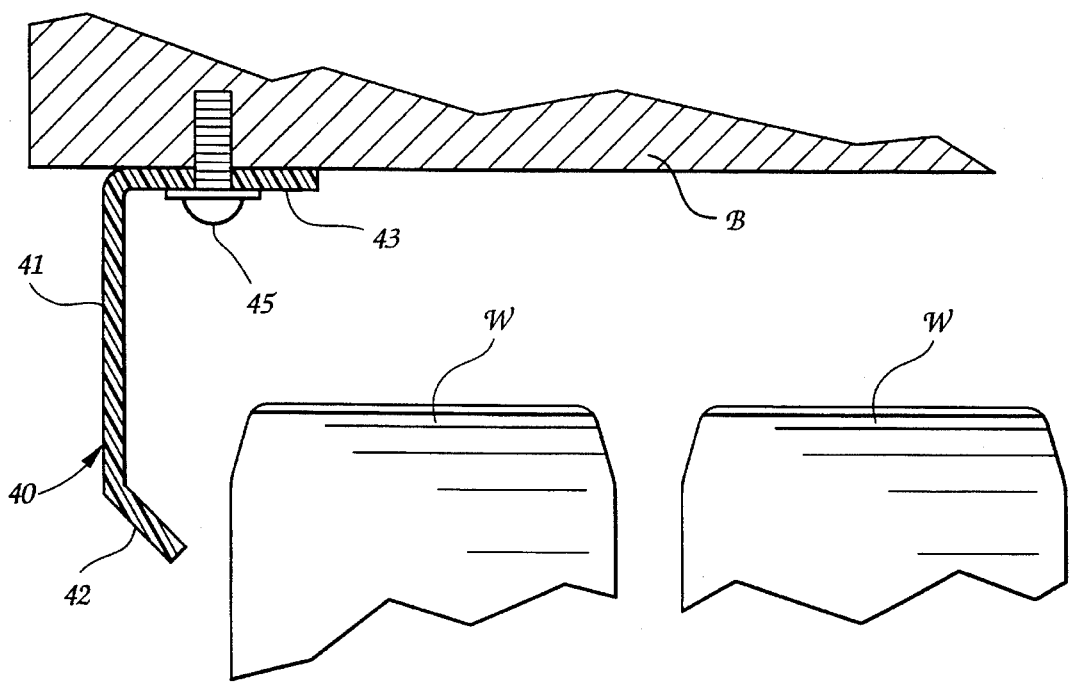
FIG. 6 is a fragmentary cross section view taken along line 6—6 of FIG. 5.

As illustrated in FIGS. 5 and 6, an alternative arrangement of the safety apparatus prevents outward spray coming from the upper portions of the tire and out from under the body of the truck. In this embodiment, a spray deflector 40, which is preferably the same as the stiffening device 20, is secured to the body B of the truck in a horizontal arrangement. In the arrangement, the spray deflector 40 catches and blocks roadway materials from sliding outwardly from under the body of the truck, and instead deflects them inwardly. As best shown in FIG. 6, the spray deflector 40 includes a generally vertically arranged downwardly depending side wall portion 41 having an overall height of only a fraction of its length. The spray deflector 40 extends generally horizontally from a position adjacent the leading edge of the stiffening device 20 forwardly above the tires to receive rainwater or other materials from the tires. An inwardly directed bottom portion 42 defines a lower edge of the spray deflector 40. A generally horizontally disposed upper wall portion 43 adjoins the main wall portion 41 at a generally perpendicular angle therewith and lies flush with the body portion of the vehicle B. The spray deflector 40 is preferably secured to the body by bolts 45.

The safety apparatus of the present invention is relatively inexpensive, and does not require extensive modification to current vehicles. The device offers a significant improvement of safety for other vehicles on the roadway and consequently the vehicles to which the arrangement is attached.

In the drawings and specification there has been set forth a preferred embodiment of the invention, and although specific terms are employed they are used in a generic and descriptive sense only and not for purposes of limitation.

I claim:

1. In combination with a vehicle, the improvement comprising a safety apparatus for minimizing the uncontrolled outward spray of water, snow, ice, slush, debris or other roadway materials from the rotating tires of the vehicle when moving, the safety apparatus comprising:

a) a generally rectangular flexible flap for being substantially vertically suspended from a portion of the vehicle immediately rearward of the tires of the vehicle, said flap having a forward side, a rearward side, and inner and outer vertical edges disposed respectively toward the inside and outside of the vehicle;

b) a single elongate rigid stiffening device mounted on said flap and positioned on Said outer vertical edge of said flap to extend vertically alongside a substantial extent of said outer vertical edge of said flap for substantially preventing materials adjacent said forward side of said flap from passing outwardly from said outer vertical edge of said flap, and for stiffening said outer edge of said flap so that the portion of said flexible flap adjacent said device remains substantially undeflected by the rearward flow of air, while said inner vertical edge of said flap remains readily deflectable by the rearward flow of air and so that the rearward flow of air deflects said flap inwardly thereby directing a substantial portion of any materials carried by the rearward flow of air inwardly toward the vehicle, said elongate rigid stiffening device comprising a generally vertical elongate main wall portion extending forwardly from said flap to overlap a portion of the vehicle tire and having an overall width of only a fraction of its length and wherein said main wall portion has an inwardly directed leading wall portion defining a leading edge thereof which also serves as the leading edge of said device.

2. A combination according to claim 1, wherein said stiffening device further comprises a rear wall portion adjoining said main wall portion and formed at a generally perpendicular angle therewith and mounted in overlying relation with one of said sides of said flexible flap.

3. A combination according to claim 2, wherein said stiffening device further comprises a top wall portion adjoining upper edges of each of said main wall portion and said rear wall portion to substantially prevent materials from passing over upper portions of said device at said outer edge of said flap in the outward direction.

4. A combination according to claim 3, wherein said top wall is formed integrally with the main wall portion and said rear wall portion.

5. A combination according to claim 2, wherein said rear wall portion is disposed on and carried by said rearward side of said flap such that said main wall portion extends generally perpendicularly and forwardly therefrom.

6. A combination according the claim 1, wherein said stiffening device is comprised of a rigid plastic material.

7. A combination according to claim 6, wherein said stiffening device includes a non-stick surface to prevent mud, ice, and other materials from adhering to the device.

8. A combination according to claim 1, wherein said leading edge is directed inwardly at an angle of between about 30° and 60° with respect to said main wall.

9. A combination according to claim 1, further including a spray deflector adapted to be secured to the vehicle generally above the tires and forward to said flap so as to further minimize the uncontrolled outward spray from upper portions of the tires wherein said spray deflector includes a generally vertically arranged downwardly depending side wall portion having an overall height of only a fraction of its length and extending generally horizontally from a position adjacent said leading edge of said stiffening device forwardly above the tires to receive rainwater or other materials from the tires, an inwardly directed bottom wall portion defining a lower edge of the spray deflector, and a generally horizontally disposed upper wall portion adjoining said main wall portion and formed at a generally perpendicular angle therewith.

10. In combination with a vehicle, the improvement comprising a safety apparatus for minimizing the uncontrolled outward spray of water, snow, ice, slush, debris, or other roadway materials from the rotating tires of the vehicle when moving, the apparatus comprising:

a) a generally rectangular flexible flap for being substantially vertically suspended from a portion of the vehicle immediately rearward of the tires of the vehicle, said flap having a forward side, a rearward side, and inner and outer vertical edges disposed respectively toward the inside and outside of the vehicle;

b) a single elongate rigid stiffening device mounted on said flap, and positioned on said outer vertical edge of said flap to extend vertically alongside a substantial extent of said outer vertical edge of said flap for substantially preventing materials adjacent said forward side of said flap from passing outwardly from said outer vertical edge of said flap, and for stiffening said outer edge of said flap so that the portion of said flap adjacent said device remains substantially undeflected by the rearward flow of air, while said inner vertical edge of said flap remains readily deflectable by the rearward flow of air and so that the rearward flow of air deflects said flap inwardly thereby directing a substantial portion of any rainwater and the like carried by the rearward flow of air inwardly toward the vehicle, said elongate rigid stiffening device comprising:

(1) a generally vertical elongate main wall portion extending forwardly from the flap and having an overall width of only a fraction of its length, (2) an inwardly directed leading wall portion adjacent said main wall portion and overlapping a portion of the vehicle tire, said leading wall portion defining a leading edge of said main wall portion which also services as the leading edge of said stiffening device, (3) a rear wall portion adjoining said main wall portion and formed at a generally perpendicular angle therewith, and for being positioned flush upon and carried by said rearward side of said flap such that said main wall portion extends generally perpendicularly and forwardly therefrom, and (4) mounting means for mounting said stiffening device upon said flexible flap.

11. A combination according to claim 10, wherein said mounting means comprise bolts and corresponding nuts.

* * * * *